US011354568B2

(12) United States Patent
Akin et al.

(10) Patent No.: US 11,354,568 B2
(45) Date of Patent: Jun. 7, 2022

(54) IN-MEMORY SPIKING NEURAL NETWORKS FOR MEMORY ARRAY ARCHITECTURES

(71) Applicant: Intel Corporation, Santa Clara, CA (US)

(72) Inventors: Berkin Akin, Hillsboro, OR (US); Seth H. Pugsley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 897 days.

(21) Appl. No.: 15/639,997

(22) Filed: Jun. 30, 2017

(65) Prior Publication Data

US 2019/0005376 A1 Jan. 3, 2019

(51) Int. Cl.
*G06N 3/04* (2006.01)
*G06N 20/00* (2019.01)
*G06N 3/063* (2006.01)
*G06N 3/08* (2006.01)

(52) U.S. Cl.
CPC .............. *G06N 3/049* (2013.01); *G06N 3/063* (2013.01); *G06N 3/08* (2013.01); *G06N 20/00* (2019.01)

(58) Field of Classification Search
CPC .......... G06N 3/049; G06N 3/08; G06N 3/063; G06N 20/00
See application file for complete search history.

(56) References Cited

U.S. PATENT DOCUMENTS

2012/0173471 A1* 7/2012 Ananthanarayanan ...................... G06N 3/049 706/25
2016/0100027 A1* 4/2016 Haghighi .............. G06F 3/0658 709/214

OTHER PUBLICATIONS

Seo et al. ("A 45nm CMOS neuromorphic chip with a scalable architecture for learning in networks of spiking neurons") (Year: 2011).*
Merolla et al. ("A digital neurosynaptic core using embedded crossbar memory with 45pJ per spike in 45nm") (Year: 2011).*
Ma et al. ("Darwin: A neuromorphic hardware co-processor based on spiking neural networks") (Year: 2016).*
Neil et al. ("Minitaur, an Event-Driven FPGA-Based Spiking Network Accelerator") (Year: 2014).*

(Continued)

*Primary Examiner* — Li B. Zhen
*Assistant Examiner* — Henry Nguyen
(74) *Attorney, Agent, or Firm* — Jordan IP Law, LLC

(57) ABSTRACT

Systems, apparatuses and methods may provide for a chip that includes a memory array having a plurality of rows corresponding to neurons in a spiking neural network (SNN) and a row decoder coupled to the memory array, wherein the row decoder activates a row in the memory array in response to a pre-synaptic spike in a neuron associated with the row. Additionally, the chip may include a sense amplifier coupled to the memory array, wherein the sense amplifier determines post-synaptic information corresponding to the activated row. In one example, the chip includes a processor to determine a state of a plurality of neurons in the SNN based at least in part on the post-synaptic information and conduct a memory array update, via the sense amplifier, of one or more synaptic weights in the memory array based on the state of the plurality of neurons.

18 Claims, 4 Drawing Sheets

(56) References Cited

OTHER PUBLICATIONS

Oskin et al., "Active Pages: A Computation Model for Intelligent Memory", International Symposium on Computer Architecture, 1998, Barcelona, 12 pages.

Seshadri et al., "Fast Bulk Bitwise AND and OR in DRAM", IEEE Computer Architecture Letters, 4 pages.

"Spiking neural network", retrieved from en.wikipedia.org/wiki/Spking_neural_network, retrieved on Jun. 2, 2017, 4 pages.

* cited by examiner

US 11,354,568 B2

IN-MEMORY SPIKING NEURAL NETWORKS FOR MEMORY ARRAY ARCHITECTURES

TECHNICAL FIELD

Embodiments generally relate to memory structures.

BACKGROUND

Machine learning solutions may use artificial neural networks (e.g., deep neural networks/DNNs, convolutional neural networks/CNNs, spiking neural networks/SNNs) in a variety of applications such as, for example, biological systems analysis, computer vision, and so forth. While SNNs have a time-dependent nature that may enable more realistic modeling of central nervous systems and other biological neural circuits, there remains considerable room for efficiency improvement. For example, conventional computer simulations of SNNs may involve the use of either separate processing and memory chips or multi-chip arrays of static random access memory (SRAM) in order to support the large scale of a typical SNN. Each approach may result in input/output (TO) traffic between chips that limits their feasibility.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
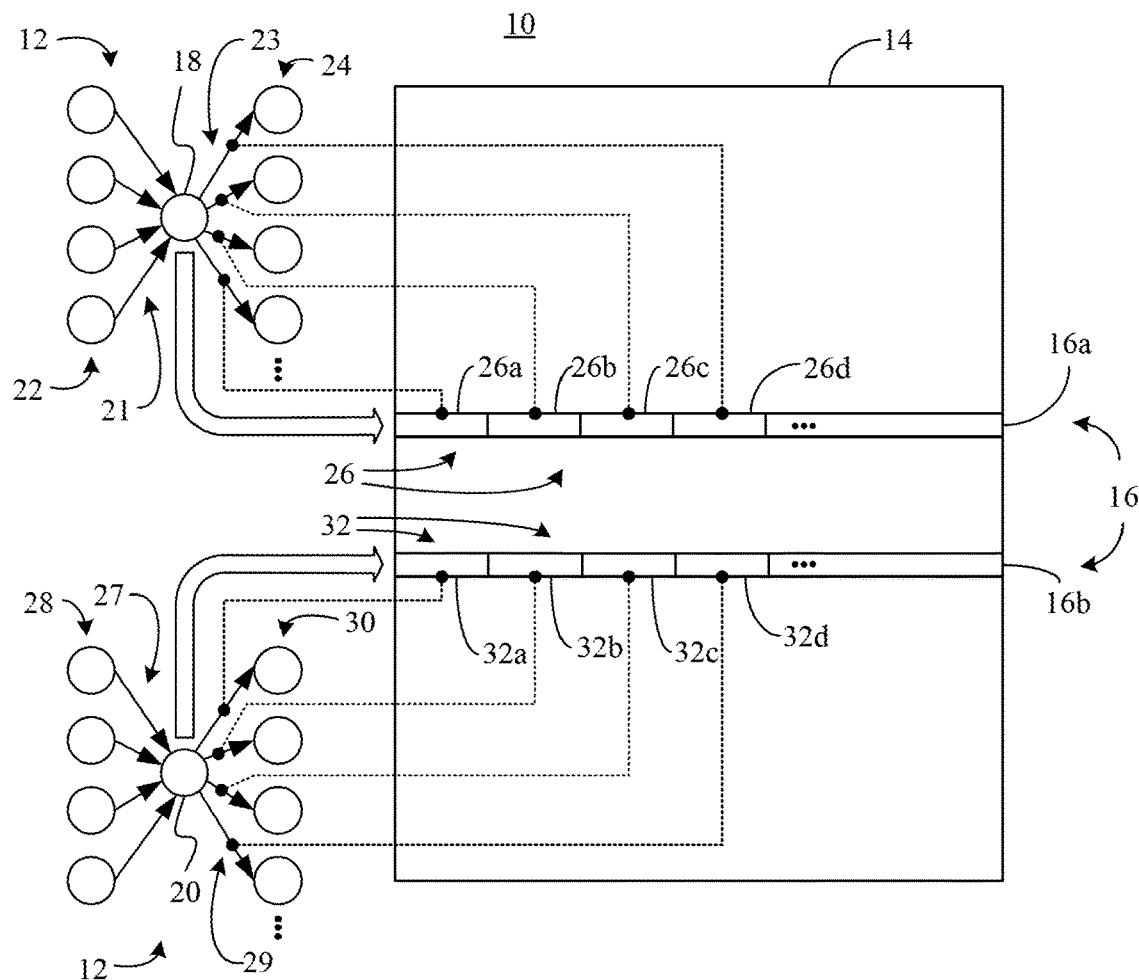
FIG. 1 is an illustration of an example of an in-memory neural network architecture according to an embodiment.

Turning now to FIG. 1, an in-memory neural network architecture 10 is shown in which an artificial neural network 12 such as, for example, a spiking neural network (SNN) may be used to support a wide variety of machine learning applications (e.g., time series analysis/sequencing). The illustrated architecture 10 includes a memory structure 14 that contains a plurality of rows 16 (16a, 16b). Each row 16 in the memory structure 14 may generally correspond to a neuron in the network 12. For example, a first row 16a in the memory structure 14 might correspond to a first neuron 18 in the network 12, a second row 16b in the memory structure 14 may correspond to a second neuron 20 in the network 12, and so forth. In the illustrated example, each row 16 stores post-synaptic information for a corresponding neuron 18, 20. In this regard, the illustrated neurons 18, 20 are each coupled to source (e.g., input) and target (e.g., output) neurons by synapses.

Thus, the illustrated first neuron 18 is coupled to a first set of source neurons 22 via a corresponding set of synapses 21 and a first set of target neurons 24 by another set of synapses 23, wherein post-synaptic information 26 (26a-26d) is stored to the first row 16a. The post-synaptic information 26 may include, for example, weight information (e.g., synaptic weights), target neuron identifier (ID) information, delay information (e.g., synaptic delays), plasticity information (e.g., indicating the ability to strengthen or weaken over time), type information (e.g., excitatory synapse, inhibitory synapse), and so forth. Moreover, the post-synaptic information 26 may be stored on a per synapse basis (e.g., as a synapse list of multiple entries). Accordingly, a first entry 26a (e.g., X bits) in the synapse list may contain information for the synapse that connects the first neuron 18 to a first target neuron in the first set of target neurons 24, a second entry 26b in the synapse list may contain information for the synapse that connects the first neuron 18 to a second target neuron in the first set of target neurons 24, and so forth. As will be discussed in greater detail, the post-synaptic information 26 may be used to update potentials in neuron states. Thus, a spike entering a neuron may cause the potential of the neuron to increase until a threshold is reached (e.g., causing a spike in that neuron).

Similarly, the second neuron 20 may be coupled to a second set of source neurons 28 via a corresponding set of synapses 27 and a second set of target neurons 30 by another set of synapses 29, wherein post-synaptic information 32 (32a-32d, e.g., weight information, target neuron ID information, delay information, plasticity information, type information, etc.) is stored to the second row 16b on a per synapse basis. Accordingly, a first entry 32a may contain information for the synapse that connects the second neuron 20 to a first target neuron in the second set of target neurons 30, a second entry 32b may contain information for the synapse that connects the second neuron 20 to a second target neuron in the second set of target neurons 30, and so forth.

Over time, the neurons 18, 20 may accumulate potential from incoming spike messages (e.g., weights received from source neurons via their corresponding synapses), until a threshold is reached. Accordingly, the neurons 18, 20 may "spike" when the sum of the synapse weights of spiking source neurons exceed a threshold associated with the neurons 18, 20. For example, a first threshold may be associated with the first neuron 18, wherein one or more neurons in the first set of source neurons 22 may spike and transmit, in response to those neurons reaching their respective thresholds, their potential to the first neuron 18 via the corresponding weighted synapses. When the first threshold is reached, the first neuron 18 may spike and transmit its potential to the first set of target neurons 24. As will be discussed in greater detail, the spike of the first neuron 18 may cause the entirety of the first row 16a to be sensed (e.g., via a sense amplifier, not shown) in parallel. Moreover, the sensed post-synaptic information from the first row 16a may be analyzed by an on-chip processor, which may restore updated values to the first row 16a via the sense amplifier based on the results of the analysis.

Similarly, a second threshold may be associated with the second neuron 20, wherein one or more neurons in the second set of source neurons 28 may spike and transmit, in response to those neurons reaching their respective thresholds, their potential to the second neuron 20 via the corresponding weighted synapses. When the second threshold is reached, the second neuron 20 may spike and transmit to the second set of target neurons 30. Again, the spike of the second neuron 20 may cause the entirety of the second row 16b to be sensed in parallel, wherein the sensed post-synaptic information from the second row 16b may be analyzed by the on-chip processor. The on-chip processor may restore the updated values to the second row 16b via the sense amplifier based on the results of the analysis.

Figure 2:
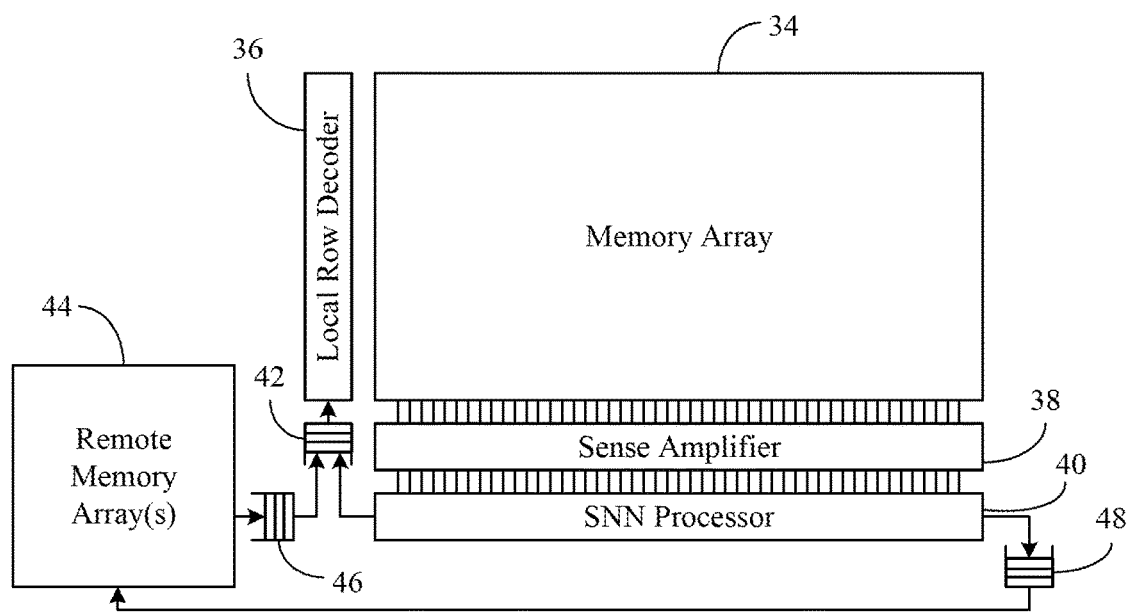
FIG. 2 is a block diagram of an example of a portion of a memory chip according to an embodiment.

FIG. 2 shows a portion of a memory chip. In the illustrated example, a memory array 34 includes a plurality of rows corresponding to neurons in an SNN, as already discussed. Pre-synaptic spikes may generally be SNN events that are interpreted as row activations in the memory array 34 (e.g., a pre-synaptic spike automatically causes the generation of a DRAM row activation command). More particularly, a row decoder 36 may be coupled to the memory array 34, wherein the row decoder 36 activates a row in the memory array 34 in response to a pre-synaptic spike in a neuron associated with the row. Additionally, a sense amplifier 38 may be coupled to the memory array 34. The sense amplifier 38 may generally determine post-synaptic information corresponding to the activated row. The post-synaptic information may include, for example, weight information, target neuron ID information, delay information, plasticity information, type information, etc., or any combination thereof.

The illustrated sense amplifier 38 is coupled to logic (e.g., logic instructions, configurable logic, fixed-functionality hardware logic) of an SNN processor 40 that determines the state (e.g., membrane potential, refractory state, recent spike timing, learning metadata) of a plurality of neurons (e.g., all neurons or a subset of all neurons) in the SNN based on the post-synaptic information. The logic of the SNN processor 40 may also conduct a memory array update, via the sense amplifier 38, of post-synaptic information (e.g., one or more synaptic weights) in the memory array 34 based on the state of the plurality of neurons. The memory array update may be conducted further based on a learning heuristic that determines whether synaptic weights are to be changed (e.g., increased to reflect a stronger correlation between neurons, decreased to reflect a weaker correlation between neurons, etc.), as well as whether any additional (e.g., target) neurons spike as a result of the spike of the current neuron. If so, the SNN processor 40 may add an entry to a local spike queue 42 that is coupled to the row decoder 36, which may process the entries in the local spike queue 42 on a first-in-first-out (FIFO) basis. In one example, each entry includes information about a pre-synaptic neuron.

Of particular note is that the memory array update may bypass off-chip communications by going directly from the SNN processor 40 through the sense amplifier 38. Accordingly, the illustrated solution may eliminate narrow input/output (TO) traffic (e.g., data IO line usage) that may otherwise limit the feasibility of the SNN. For example, in conventional SNN architectures, updating synaptic weights after a learning process may lead to significant write-back traffic to memory. The write-back traffic may in turn cause significant energy and performance overheads. By contrast, the illustrated solution leverages the inherent nature of the memory array 34 (e.g., DRAM) to optimize learning performance.

In this regard, baseline DRAM read operations may involve activating an entire row, destroying the values in the memory cells, sensing them in the sense amplifier 38, and subsequently restoring the values from the sense amplifier 38 to the memory array 34. The illustrated SNN processor 40 may update the weights in place, directly in the sense amplifier 38. The sense amplifier 38 may then restore the activated row with the updated weights to the memory array 34, which may be similar to a baseline DRAM destructive read and restore operation. The illustrated solution therefore achieves synaptic updates without performing any additional reads or writes. Finally, after restoring the synapse list in the memory array 34, the bitlines may be pre-charged in preparation for the next neuron spike (i.e., row activation).

As already noted, the illustrated SNN processor 40 leverages the row activate and restore operations to read and write an entire list of synapses in parallel. The SNN processor 40 may include many parallel processing elements (PEs) that can also process an entire synapse list in the sense amplifier 38 in parallel. If the PEs offer enough performance to complete the processing of an entire synapse list between the time that the row is sensed, but before the restore operation starts, then a spike message may be fully processed in the time of a single row cycle of the memory array 34. Assuming 8 Kbit rows in a single logical DRAM array and a row-cycle time of 50 ns (including activate, restore and pre-charge), then a single DRAM array may provide 20 GB/s of bandwidth. The values provided herein are to facilitate discussion only and may vary depending on the circumstances.

Indeed, multiple DRAM arrays working in parallel per DRAM bank and multiple banks per chip may provide additional dimensions of parallelism and more potential for enhanced SNN performance. In this regard, the local spike queue 42 may also be populated by one or more remote memory arrays 44 (e.g., on-chip or off-chip) via a remote spike in queue 46. Accordingly, the illustrated SNN processor 40 populates a remote spike out queue 48 when local neuron spikes impact neurons associated with the remote memory array(s) 44. In one example, the entries in the remote spike out queue 48 include information about pre-synaptic neurons.

The memory array 34 may include a NAND flash memory, three-dimensional (3D) NAND memory array devices, or other memory devices that follow a row-column activation scheme. Non-volatile memory is a storage medium that does not require power to maintain the state of data stored by the medium. In one embodiment, the memory array 34 is a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use silicon-oxide-nitride-oxide-silicon (SONOS) memory, electrically erasable programmable read-only memory (EE-PROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices 106 that implement such standards may be referred to as DDR-based interfaces.

Figure 3:
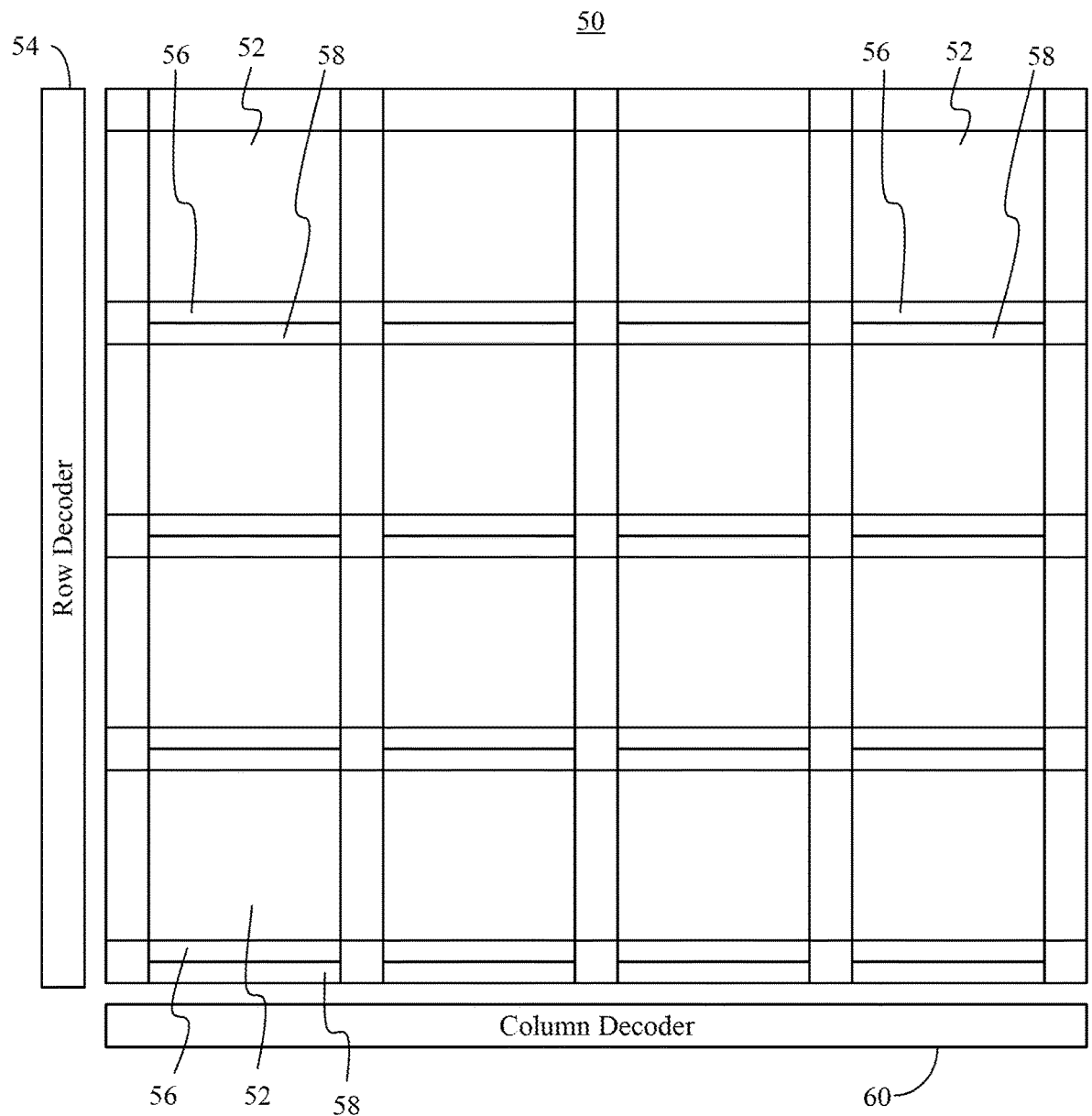
FIG. 3 is a block diagram of an example of a memory chip according to an embodiment.

FIG. 3 shows a memory chip 50 in which a row decoder 54 is coupled to a plurality of memory arrays 52, that may each operate similarly to the memory array 34 (FIG. 2), already discussed. Accordingly, the row decoder 54 may activate rows in the memory arrays 52 in response to pre-synaptic spikes in neurons associated with the rows. Each memory array 52 may be coupled to a distributed sense amplifier 56 that determines post-synaptic information corresponding to the activated rows. The post-synaptic information may be stored across the activated rows in a dense or sparse fashion, depending on the circumstances. In the case of dense connections, post-synaptic information may omit individual target neuron IDs and keep synaptic information of each synapse sequentially along the activated row. In this case, the position of each synapse in the activated row will indicate the target neuron ID. For sparse connections, the activated row may include the number of synapses, size of each synaptic information, individual target neuron IDs to decode the corresponding synaptic information per target neuron, and so forth. Synapses in the rows of the memory array may be grouped according to their synaptic delays and/or weights to optimize processing. Additionally, a distributed processor 58 may include logic (e.g., logic instructions, configurable logic, fixed-functionality hardware logic) coupled to the distributed sense amplifier 56 to determine the state (e.g., membrane potential, refractory state, recent spike timing, learning metadata) of the synapses in the SNN based on the post-synaptic information. The logic of the distributed processor 58 may also conduct updates, via the distributed sense amplifier 56, of one or more synaptic weights in the memory arrays 52 based on the state of the synapses and a learning heuristic. The memory array updates may bypass off-chip communications that may otherwise involve a data IO line (not shown), a column select line (not shown) and/or a column decoder 60.

If the distributed processor 58 executes logic instructions, the instructions may be stored to an appropriate region of one or more of the memory arrays 52 or elsewhere in the system. Additionally, the memory chip 50 may generally be part of an electronic device/platform having computing functionality (e.g., personal digital assistant/PDA, notebook computer, tablet computer, desktop computer, convertible tablet, server), communications functionality (e.g., smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof.

Figure 4:
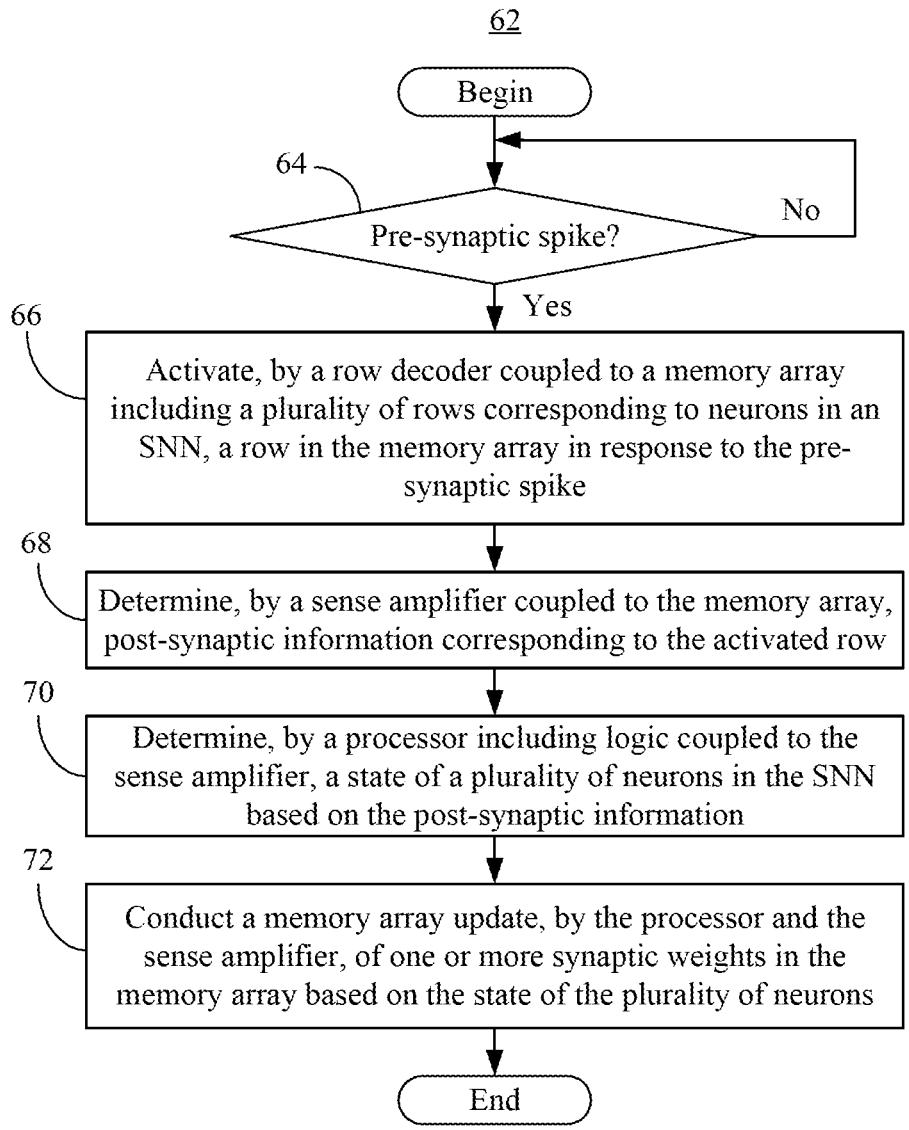
FIG. 4 is a flowchart of an example of a method of operating a memory chip according to an embodiment.

FIG. 4 shows a method 62 of operating a memory chip. The method 62 may generally be implemented in a memory chip such as, for example, the memory chip 50 (FIG. 3), already discussed. More particularly, the method 62 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 62 may be written in any combination of one or more programming languages, including an object oriented programming language such as Java, Smalltalk, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/ or other structural components that are native to hardware (e.g., host processor, central processing unit/CPU, microcontroller, etc.).

Illustrated processing block 64 provides for determining whether a pre-synaptic spike has occurred. Block 64 may include determining the state of a plurality of neurons in an SNN. In this regard, SNN processing may not involve complex compute elements such as floating-point units. Rather, block 64 may only involve relatively simple computations such as low precision (4-16 bits) add, compare and control operations to determine whether a neuron threshold has been reached. If a pre-synaptic spike has occurred, block 66 may activate, by a row decoder coupled to a memory array including a plurality of rows corresponding to neurons in an SNN, a row in the memory array. Additionally, illustrated block 68 determines, by a sense amplifier coupled to the memory array, post-synaptic information (e.g., weight, target neuron ID, delay, plasticity and/or type information) corresponding to the activated row.

An on-chip processor including logic coupled to the sense amplifier may determine a state of a plurality of neurons in the SNN at block 70 based on the post-synaptic information. Block 70 may also be conducted based on a learning heuristic. Illustrated block 72 conducts a memory array update, by the processor and the sense amplifier, of one or more synaptic weights in the memory array based on the state of the plurality of neurons. The memory array update, which may bypass off-chip communications, may include an addition of an entry (e.g., containing information about a pre-synaptic neuron) to a local spike queue that is coupled to the processor and the row decoder, an addition of an entry (e.g., containing information about a pre-synaptic neuron) to a remote spike queue that is coupled to the processor and an off-chip memory array, etc., or any combination thereof. If a pre-synaptic spike is not detected at block 64, the illustrated method 62 repeats block 64. Additionally, the method 62 may repeat upon the completion of block 72 in an iterative fashion.

Turning now to FIG. 4, a memory-based computing system 61 is shown. The computing system 61 may generally be part of an electronic device/platform having computing functionality (e.g., personal digital assistant/PDA, notebook computer, tablet computer, server), communications functionality (e.g., smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 61 includes a power supply 63 to provide power to the system 61 and a host processor 65 (e.g., central processing unit/CPU) having an integrated memory controller (IMC) 667 that is coupled to a system memory 69.

The illustrated system 61 also includes an input output (IO) module 71 implemented together with the processor 65 on a semiconductor die 73 as a system on chip (SoC), wherein the IO module 71 functions as a host device and may communicate with, for example, a display 75 (e.g., touch screen, liquid crystal display/LCD, light emitting diode/LED display), a network controller 77, and the memory chip 50.

The network controller 77 may obtain data associated with an SNN. As already noted, the memory chip 50 may include a memory array having a plurality of rows corresponding to neurons in the SNN and a row decoder coupled to the memory array. The row decoder may activate a row in the memory array in response to a pre-synaptic spike in a neuron associated with the row. The memory chip 50 may also include a sense amplifier coupled to the memory array, wherein the sense amplifier determines post-synaptic information corresponding to the activated row.

Figure 5:
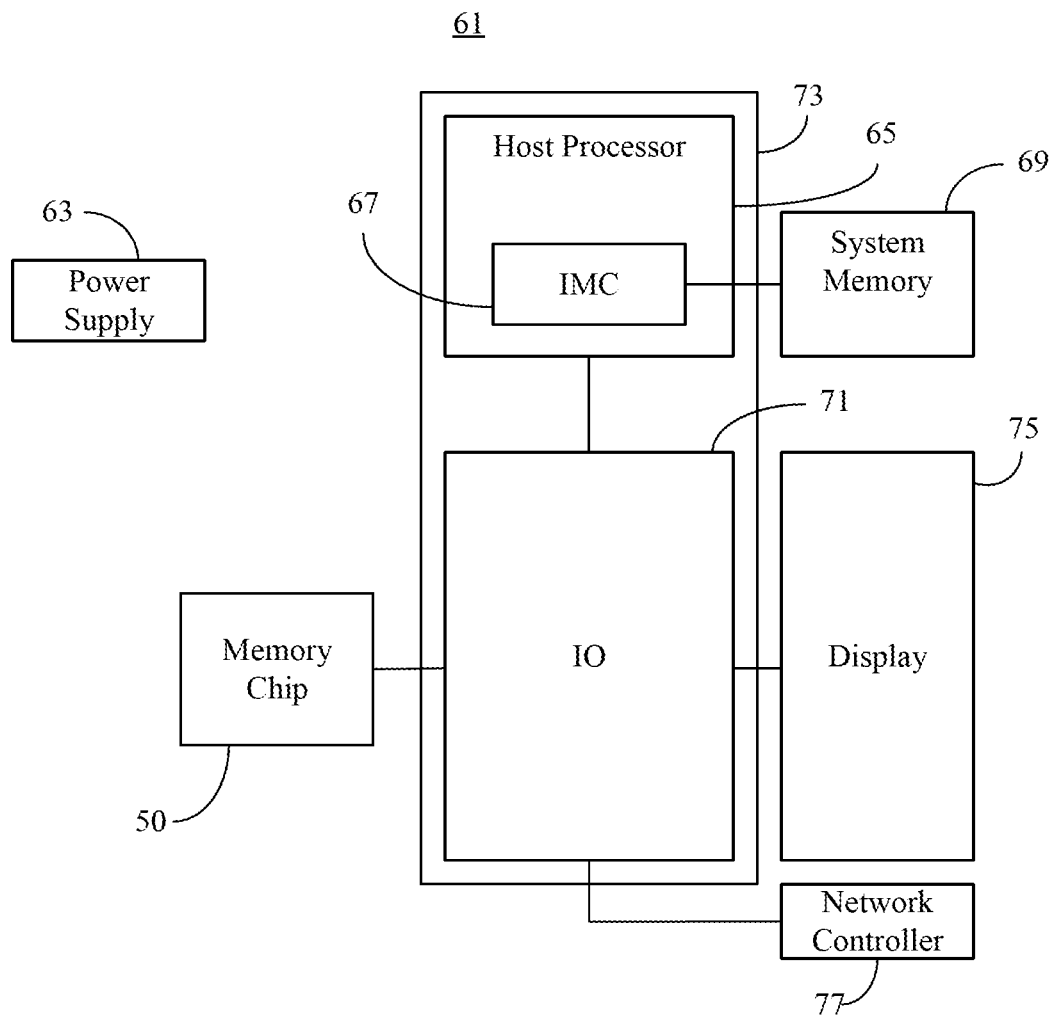
FIG. 5 is a block diagram of an example of a computing system according to an embodiment.
Figure 6:
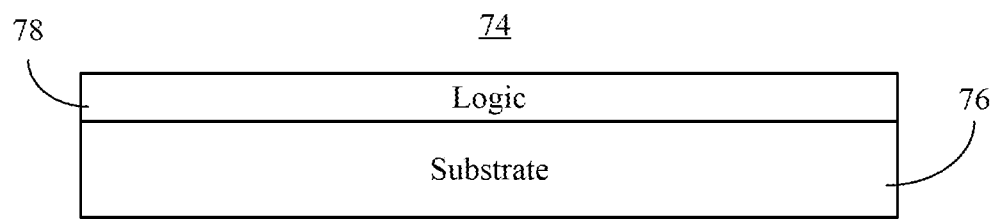
FIG. 6 is an illustration of an example of a semiconductor package apparatus according to an embodiment.

FIG. 5 shows a semiconductor package apparatus 74 (e.g., chip, die) that includes a substrate 76 (e.g., silicon, sapphire, gallium arsenide) and logic 78 (e.g., transistor array and other integrated circuit/IC components) coupled to the substrate 76. The logic 78, which may be implemented in configurable logic and/or fixed-functionality logic hardware, may generally implement one or more aspects of the method 62 (FIG. 4), already discussed. Thus, the logic 78 may activate a row in a memory array in response to a pre-synaptic spike, determine post-synaptic information corresponding to the activated row, determine a state of a plurality of neurons in an SNN based on the post-synaptic information and/or a learning heuristic, conduct a memory array update of one or more synaptic weights in the memory array based on the state of the plurality of neurons, and so forth.

ADDITIONAL NOTES AND EXAMPLES

Example 1 may include a chip comprising a memory array including a plurality of rows corresponding to neurons in a spiking neural network (SNN), a row decoder coupled to the memory array, the row decoder to activate a row in the memory array in response to a pre-synaptic spike in a neuron associated with the row, a sense amplifier coupled to the memory array, the sense amplifier to determine post-synaptic information corresponding to the activated row, and a processor including logic coupled to the sense amplifier, wherein the logic is implemented at least partly in one or more of configurable logic or fixed-functionality hardware logic, the logic coupled to the sense amplifier to determine a state of a plurality of neurons in the SNN based on the post-synaptic information and conduct a memory array update, via the sense amplifier, of one or more synaptic weights in the memory array based on the state of the plurality of neurons and a learning heuristic, wherein the memory array update is to bypass off-chip communications.

Example 2 may include the chip of Example 1, further including a local spike queue coupled to the processor and the row decoder, wherein the memory array update is to include an addition of an entry to the local spike queue, and wherein the entry is to include information about a pre-synaptic neuron.

Example 3 may include the chip of Example 1, further including a remote spike queue coupled to the processor and the row decoder, wherein the memory array update is to include an addition of an entry to the remote spike queue, and wherein the entry is to include information about a pre-synaptic neuron.

Example 4 may include the chip of any one of Examples 1 to 3, wherein the post-synaptic information is to include one or more of weight information, target neuron identifier information, delay information, plasticity information or type information, wherein the state of the plurality of neurons is to be maintained on the processor, and wherein the state is to include one or more of membrane potential, refractory state, recent spike timing or learning metadata.

Example 5 may include a method of operating a chip, comprising activating, by a row decoder coupled to a memory array including a plurality of rows corresponding to neurons in a spiking neural network (SNN), a row in the memory array in response to a pre-synaptic spike in a neuron associated with the row, and determining, by a sense amplifier coupled to the memory array, post-synaptic information corresponding to the activated row.

Example 6 may include the method of Example 5, further comprising determining, by a processor including logic coupled to the sense amplifier, a state of a plurality of neurons in the SNN based on the post-synaptic information, and conducting a memory array update, by the processor and the sense amplifier, of one or more synaptic weights in the memory array based on the state of the plurality of neurons.

Example 7 may include the method of Example 6, wherein the memory array update bypasses off-chip communications.

Example 8 may include the method of Example 6, wherein the memory array update is conducted further based on a learning heuristic.

Example 9 may include the method of Example 6, wherein the memory array update includes an addition of an entry to a local spike queue coupled to the processor and the row decoder, and wherein the entry includes information about a pre-synaptic neuron.

Example 10 may include the method of Example 6, wherein the memory array update includes an addition of an entry to a remote spike queue coupled to the processor and an off-chip memory array, and wherein the entry includes information about a pre-synaptic neuron.

Example 11 may include the method of any one of Examples 5 to 10, wherein the post-synaptic information includes one or more of weight information, target neuron identifier information, delay information, plasticity information or type information, wherein the state of the plurality of neurons is maintained on the processor, and wherein the state includes one or more of membrane potential, refractory state, recent spike timing or learning metadata.

Example 12 may include a chip comprising a memory array including a plurality of rows corresponding to neurons in a spiking neural network (SNN), a row decoder coupled to the memory array, the row decoder to activate a row in the memory array in response to a pre-synaptic spike in a neuron associated with the row, and a sense amplifier coupled to the memory array, the sense amplifier to determine post-synaptic information corresponding to the activated row.

Example 13 may include the chip of Example 12, further comprising a processor including logic coupled to the sense amplifier, wherein the logic is implemented at least partly in one or more of configurable logic or fixed-functionality hardware logic, the logic coupled to the sense amplifier to determine a state of a plurality of neurons in the SNN based on the post-synaptic information, and conduct a memory array update, via the sense amplifier, of one or more synaptic weights in the memory array based on the state of the plurality of neurons.

Example 14 may include the chip of Example 13, wherein the memory array update is to bypass off-chip communications.

Example 15 may include the chip of Example 13, wherein the memory array update is to be conducted further based on a learning heuristic.

Example 16 may include the chip of Example 13, further including a local spike queue coupled to the processor and the row decoder, wherein the memory array update is to include an addition of an entry to the local spike queue, and wherein the entry is to include information about a pre-synaptic neuron.

Example 17 may include the chip of Example 13, further including a remote spike queue coupled to the processor and the row decoder, wherein the memory array update is to include an addition of an entry to the remote spike queue, and wherein the entry is to include information about a pre-synaptic neuron.

Example 18 may include the chip of any one of Examples 12 to 17, wherein the post-synaptic information is to include one or more of weight information, target neuron identifier information, delay information, plasticity information or type information, wherein the state of the plurality of neurons is to be maintained on the processor, and wherein the state is to include one or more of membrane potential, refractory state, recent spike timing or learning metadata.

Example 19 may include at least one computer readable storage medium comprising a set of instructions, which when executed by a chip, cause the chip to determine a state of a plurality of neurons in a spiking neural network (SNN) based on post-synaptic information from a sense amplifier on the chip, wherein the post-synaptic information is to correspond to an activated row in a memory array on the chip, and conduct a memory array update, via the sense amplifier, of one or more synaptic weights in the memory array based on the state of the plurality of neurons.

Example 20 may include the at least one computer readable storage medium of Example 19, wherein the memory array update is to bypass off-chip communications.

Example 21 may include the at least one computer readable storage medium of Example 19, wherein the memory array update is to be conducted further based on a learning heuristic.

Example 22 may include the at least one computer readable storage medium of Example 19, wherein the memory array update is to include an addition of an entry to the local spike queue, and wherein the entry is to include information about a pre-synaptic neuron.

Example 23 may include the at least one computer readable storage medium of Example 19, wherein the memory array update is to include an addition of an entry to a remote spike queue, and wherein the entry is to include information about a pre-synaptic neuron.

Example 24 may include the at least one computer readable storage medium of any one of Examples 19 to 23, wherein the post-synaptic information is to include one or more of weight information, target neuron identifier information, delay information, plasticity information or type information, wherein the state of the plurality of neurons is to be maintained on the processor, and wherein the state is to include one or more of membrane potential, refractory state, recent spike timing or learning metadata.

Example 25 may include a chip comprising means for activating, by a row decoder coupled to a memory array including a plurality of rows corresponding to neurons in a spiking neural network (SNN), a row in the memory array in response to a pre-synaptic spike in a neuron associated with the row, and means for determining, by a sense amplifier coupled to the memory array, post-synaptic information corresponding to the activated row.

Example 26 may include the chip of Example 25, further comprising means for determining, by a processor including logic coupled to the sense amplifier, a state of a plurality of neurons in the SNN based on the post-synaptic information, and means for conducting a memory array update, by the processor and the sense amplifier, of one or more synaptic weights in the memory array based on the state of the plurality of neurons.

Example 27 may include the chip of Example 26, wherein the memory array update is to bypass off-chip communications.

Example 28 may include the chip of Example 26, wherein the memory array update is to be conducted further based on a learning heuristic.

Example 29 may include the chip of Example 26, wherein the memory array update is to include an addition of an entry to a local spike queue coupled to the processor and the row decoder, and wherein the entry is to include information about a pre-synaptic neuron.

Example 30 may include the chip of Example 26, wherein the memory array update is to include an addition of an entry to a remote spike queue coupled to the processor and an off-chip memory array, and wherein the entry is to include information about a pre-synaptic neuron.

Example 31 may include the chip of any one of Examples 25 to 30, wherein the post-synaptic information is to include one or more of weight information, target neuron identifier information, delay information, plasticity information or type information, wherein the state of the plurality of neurons is to be maintained on the processor, and wherein the state is to include one or more of membrane potential, refractory state, recent spike timing or learning metadata.

Technology described herein may therefore provide a neuromorphic computing solution to SNN that fits naturally with existing memory architectural ideas (row activation, restore, etc.), and is tightly integrated with existing memory architecture features (sense amplifiers, row decoders, etc.). Indeed, SNNs may be an energy efficient path to machine learning, and the technology described herein may provide the opportunity to build processors for large scale SNNs made out of eDRAM (embedded DRAM), a byte addressable. write-in-place non-volatile memory such as three dimensional (3D) crosspoint, or any other row activate+ column access memory technology, without relying on the limited density of SRAM. The technology may bring processor-in-memory (PIM) and high density memory together in one chip. Processing may be done very near where the data is stored, without traversing external IOs or even the internal global wires of the chip. Such an approach may enable all of the memory arrays of the chip to be active in parallel, without contending for external IO bandwidth. Data may also be stored in very dense memories, which enables larger SNN sizes to be achieved.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A chip comprising:
a memory array including a plurality of rows corresponding to neurons in a spiking neural network (SNN);
a row decoder coupled to the memory array, the row decoder to activate a row in the tnetnory array in response to a pre-synaptic spike in a neuron associated with the row;
a sense amplifier coupled to the memory array, the sense amplifier to determine post-synaptic information corresponding to the activated row; and
a processor including logic coupled to the sense amplifier, wherein the logic is implemented at least partly in one or more of configurable logic or fixed-functionality hardware logic, the logic coupled to the sense amplifier to:
determine a state of a plurality of neurons in the SNN based on the post-synaptic information; and
conduct a memory array update, via the sense amplifier, of one or more synaptic weights in the memory array based on the state of the plurality of neurons and a learning heuristic, wherein the memory array update is to bypass off-chip communications by operations to restore the values from the sense amplifier to the memory array, wherein the memory array update is to include an addition of an entry to a local spike queue, and wherein the local spike queue is populated by one or more remote memory arrays via a remote spike queue,
wherein a plurality of synapses in the plurality of rows of the memory array are grouped according to a synaptic delay and the synaptic weight associated with each synapse.

2. The chip of claim 1, further including the local spike queue, wherein the local spike queue is coupled to the processor and the row decoder, and wherein the entry is to include information about a pre-synaptic neuron.

3. The chip of claim 1, further including the remote spike queue, wherein the remote spike queue is coupled to the one or more remote memory arrays, wherein the memory array update is to include an addition of an entry to the remote spike queue, and wherein the entry is to include information about a pre-synaptic neuron.

4. The chip of claim 1, wherein the post-synaptic information is to include one or more of weight information, target neuron identifier information, delay information, plasticity information or type information, wherein the state of the plurality of neurons is to be maintained on the processor, and wherein the state is to include one or more of membrane potential, refractory state, recent spike timing or learning metadata.

5. A method of operating a chip, comprising:
activating, by a row decoder coupled to a memory array including a plurality of rows corresponding to neurons in a spiking neural network (SNN), a row in the memory array in response to a pre-synaptic spike in a neuron associated with the row;
determining, by a sense amplifier coupled to the memory array, post-synaptic information corresponding to the activated row;
determining, by a processor includinu logic coupled to the sense am ate of a plurality of neurons in the SNN based on the post-synaptic information; and
conducting a memory array update, by the sense amplifier, of one or more synaptic weights in the memory array, wherein the memory array update is to bypass off-chip communications by operations to restore the values from the sense amplifier to the memory array, wherein the memory array update is to include an addition of an entry to a local spike queue, and wherein the local spike queue is populated by one or more remote memory arrays via a remote spike queue,
wherein a plurality of synapses in the plurality of rows of the memory array are grouped according to a synaptic delay and the synaptic weight associated with each synapse.

6. The method of claim 5, further comprising:
wherein the memory array update is based on the state of the plurality of neurons.

7. The method of claim 5, wherein the memoryarray update is conducted further based on a learning heuristic.

8. The method of claim 5, wherein the entry includes information about a pre-synaptic neuron.

9. The method of claim 5, wherein the post-synaptic information includes one or more of weight information, target neuron identifier information, delay information, plasticity information or type information.

10. A system comprising:
a power supply; and
a chip, the chip comprising:
a memory array including a pluralitv of rows corresponding to neurons in a spiking neural network (SNN);
a row decoder coupled to the memory array, the row decoder to activate a row in the memory array in response to a pre-synaptic spike in a neuron associated with the row;
a sense amplifier coupled to the memory array, the sense amplifier to determine tic information corresponding to the activated row and
a processor including logic coupled to the sense amplifier, wherein the logic is implemented at least partly in one or more of configurable logic is or fixed-functional hardware logic, the logic coupled to the sense amplifier to:
determine a state of a plurality of neurons in the SNN based on the post-synaptic information; and
conduct a memory array update, via the sense amplifier, of one or more synaptic weights in the memory array based on the state of the plurality of neurons and a learning heuristic, wherein the memory array update is to bypass off-chip communications by operations to restore the values from the sense amplifier to the memory array, wherein the memo arra a date is to include an addition of an entry to a local spike queue, and wherein the local spike queue is populated by one or more remote memory arrays via a remote spike queue,
wherein a plurality of synapses in the plurality of rows of the memory array are grouped according to a synaptic delay and the synaptic weight associated with each synapse.

11. The chip of claim 10, wherein the memory array update is to be conducted further based on a learning heuristic.

12. The chip of claim 10, further including the local spike queue, wherein the local spike queue is coupled to the processor and the row decoder, and wherein the entry is to include information about a pre-synaptic neuron.

13. The chip of claim 10, further including the remote spike queue, wherein the remote spike queue is coupled to the one or more remote memory arrays, wherein the memory array update is to include an addition of an entry to the remote spike queue, and wherein the entry is to include information about a pre-synaptic neuron.

14. The chip of claim 10, wherein the post-synaptic information is to include one or more of weight information, target neuron identifier information, delay information, plasticity information or type information.

15. At least one non-transitory computer readable storage medium comprising a set of instructions, which when executed by a chip, cause the chip to:
activate a row in a memory array including a plurality of rows corresponding to neurons in a spiking neural network (SNN) in response to a pre-synaptic spike in a neuron associated with the row,
determine, by a sense amplifier coupled to the memory array, post-synaptic information corresponding to the activated row;
determine a state of a plurality of neurons in the spiking neural network (SNN) based on the post-synaptic information from the sense amplifier on the chip, wherein the post-synaptic information is to correspond to the activated row in the plurality of rows of the memory array on the chip; and
conduct a memory array update, via the sense amplifier, of one or more synaptic weights in the memory array based on the state of the plurality of neurons, wherein the memory array update is to bypass off-chip communications by operations to restore the values from the sense amplifier to the memory array, wherein the memory array update is to include an addition of an entry to a local spike queue, and wherein the local spike queue is populated by one or more remote memory arrays via a remote spike queue,
wherein a plurality of synapses in the plurality of rows of the memory array are grouped according to a synaptic delay and the synaptic weight associated with each synapse.

16. The at least one non-transitory computer readable storage medium of claim 15, wherein the memory array update is to be conducted further based on a learning heuristic.

17. The at east one non-transitory computer readable storage medium of claim 15, wherein the entry is to include information about a pre-synaptic neuron.

18. The at least one non-transitory computer readable storage medium of claim 15, wherein the post-synaptic information is to include one or more of weight information, target neuron identifier information, delay information, plasticity information or type information.

* * * * *